United States Patent [19]

Marinelli

[11] 4,415,179
[45] Nov. 15, 1983

[54] AXLE AND AIR BAG SUSPENSION

[76] Inventor: Joseph A. Marinelli, P.O. Box 859, Frew Mill Rd., New Castle, Pa. 16103

[21] Appl. No.: 254,399

[22] Filed: Apr. 15, 1981

[51] Int. Cl.$^3$ ............................................. B60G 11/62
[52] U.S. Cl. ..................................... 280/713; 280/683
[58] Field of Search ...................... 280/702, 713, 683; 267/11 R, 18, 52; 180/71

[56] References Cited

U.S. PATENT DOCUMENTS

| | | | |
|---|---|---|---|
| 3,140,880 | 7/1964 | Masser | 267/11 R |
| 3,433,493 | 3/1969 | Hirst | 280/702 |
| 3,547,215 | 12/1970 | Bird | 180/71 |
| 3,547,464 | 12/1970 | Drewitz | 267/63 R |
| 3,709,517 | 1/1973 | Wossner | 280/702 |
| 3,773,347 | 11/1973 | Traylor | 280/713 |
| 3,782,753 | 1/1974 | Sweet et al. | 280/712 |

*Primary Examiner*—Richard A. Bertsch
*Attorney, Agent, or Firm*—Harvey B. Jacobson

[57] ABSTRACT

A vehicle chassis is provided with a forward mounting portion and a front-to-rear extending trailing arm has its forward end pivotally supported from the mounting portion for oscillation about a horizontal axis extending transversely of the arm. The rear end portion of the arm is clampingly anchored to a corresponding axle end by a resilient material bushed clamp sleeve stationarily mounted on the axle end and clamped about the rear end of the trailing arm for limited angular displacement relative thereto and against longitudinal displacement relative to the trailing arm. By support from the clamp sleeve which is stationarily mounted on the axle end, the lower air bag mount portion is stationary relative to the axle end and the rear end of the trailing arm may oscillate slightly relative to the clamp sleeve. A Y-shaped stabilizer bar is also provided with the free ends of its arms pivoted from the forward chassis mount for oscillation about an axis coaxial with the axis of oscillation of the trailing arm and base leg of the Y-shaped stabilizer bar is anchored to the longitudinal midportion of the associated axle by a resilient bushing structure allowing relative oscillation between the base leg of the stabilizer bar about an axis normal to the associated axle.

13 Claims, 7 Drawing Figures

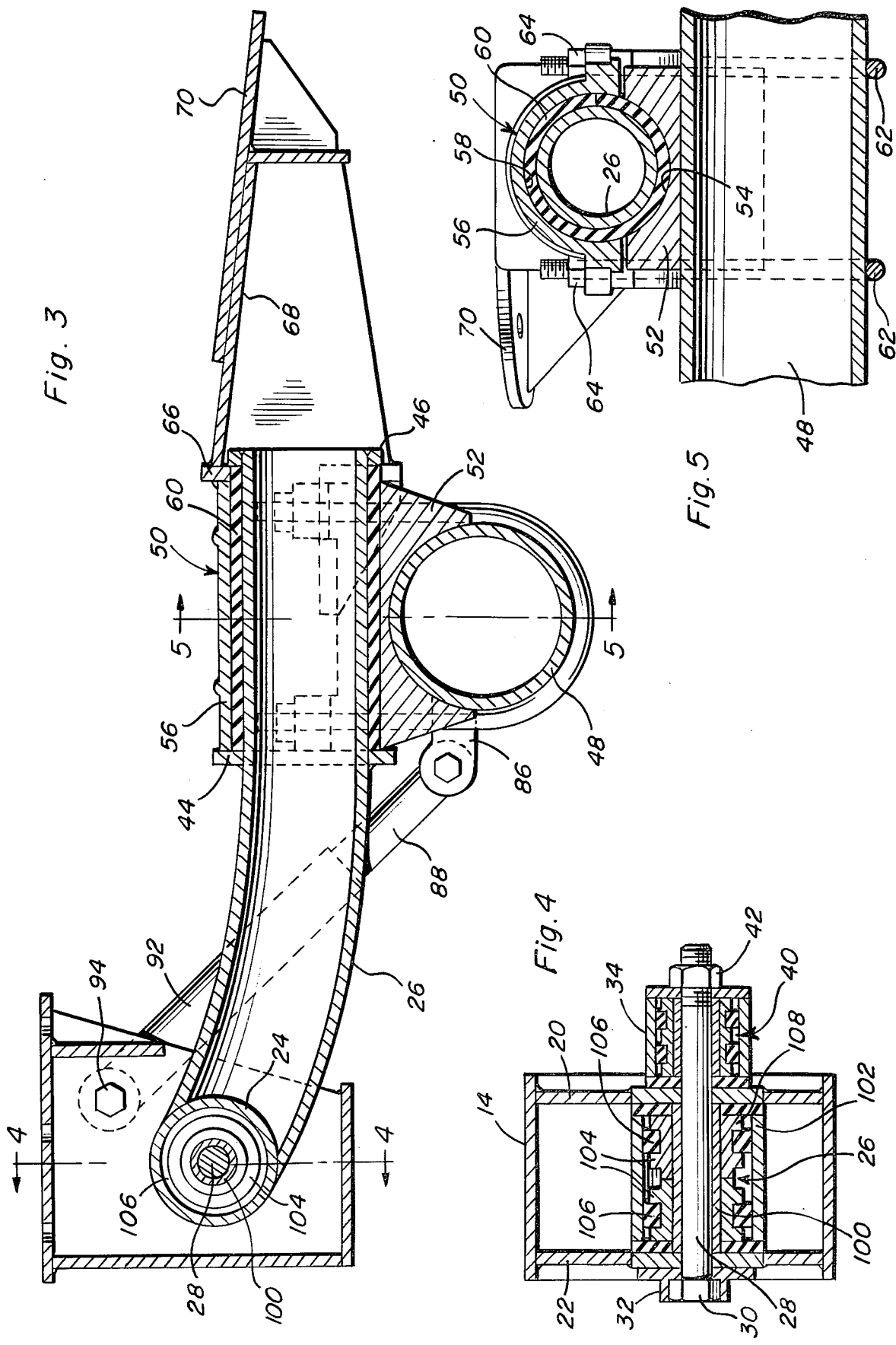

AXLE AND AIR BAG SUSPENSION

BACKGROUND OF THE INVENTION

Air bag suspension systems utilizing trailing arms for the support of axles from heavy-duty vehicle chassis are becoming increasingly popular, but convenient air bag equipped trailing arm axle suspension systems are subject to excessive axle misalignment when the associated chassis is moving over rough ground or executing sharp turns. Accordingly, a need exists for a trailing arm air bag equipped axle suspension system which will assure substantially proper axle alignment, even when an associated vehicle is moving over rough roads and executing sharp turns.

Suspension systems including some of the general structure and operational features of the instant invention are disclosed in U.S. Pat. Nos. 2,173,498, 3,140,880, 3,482,854, 3,547,215, 3,547,464, 3,773,347 and 3,782,753.

SUMMARY OF THE INVENTION

The main object of this invention is to provide an improved trailing arm air bag equipped axle suspension system which will be operative to limit axle misalignment to a minimum while an associated vehicle is moving over rough roads and executing sharp turns.

Yet another object of this invention is to provide an axle suspension system in accordance with the preceding object and designed in a manner such that generally basic trailing arm mounting structure and generally basic air bag mounting structure may be utilized throughout.

Another very important object of this invention is to provide an axle suspension system constructed in a manner whereby air bag replacement and maintenance may be readily accomplished independent of more than minimal disassembly of the axle suspension system.

A final object of this invention to be specifically enumerated herein is to provide a trailing arm air bag equipped axle suspension system in accordance with the preceding objects and which will conform to conventional forms of manufacture, be of simple construction and easy to fabricate, so as to provide a device that will be economically feasible, long lasting and relatively inexpensive.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged fragmentary longitudinal vertical sectional view taken substantially upon the plane indicated by the section line 3—3 of FIG. 2;

FIG. 4 is a transverse vertical sectional view taken substantially upon the plane indicated by the section line 4—4 of FIG. 3;

FIG. 5 is a fragmentary transverse vertical sectional view taken substantially upon the plane indicated by the section line 5—5 of FIG. 3;

DETAILED DESCRIPTION OF THE INVENTION

Figure 1:
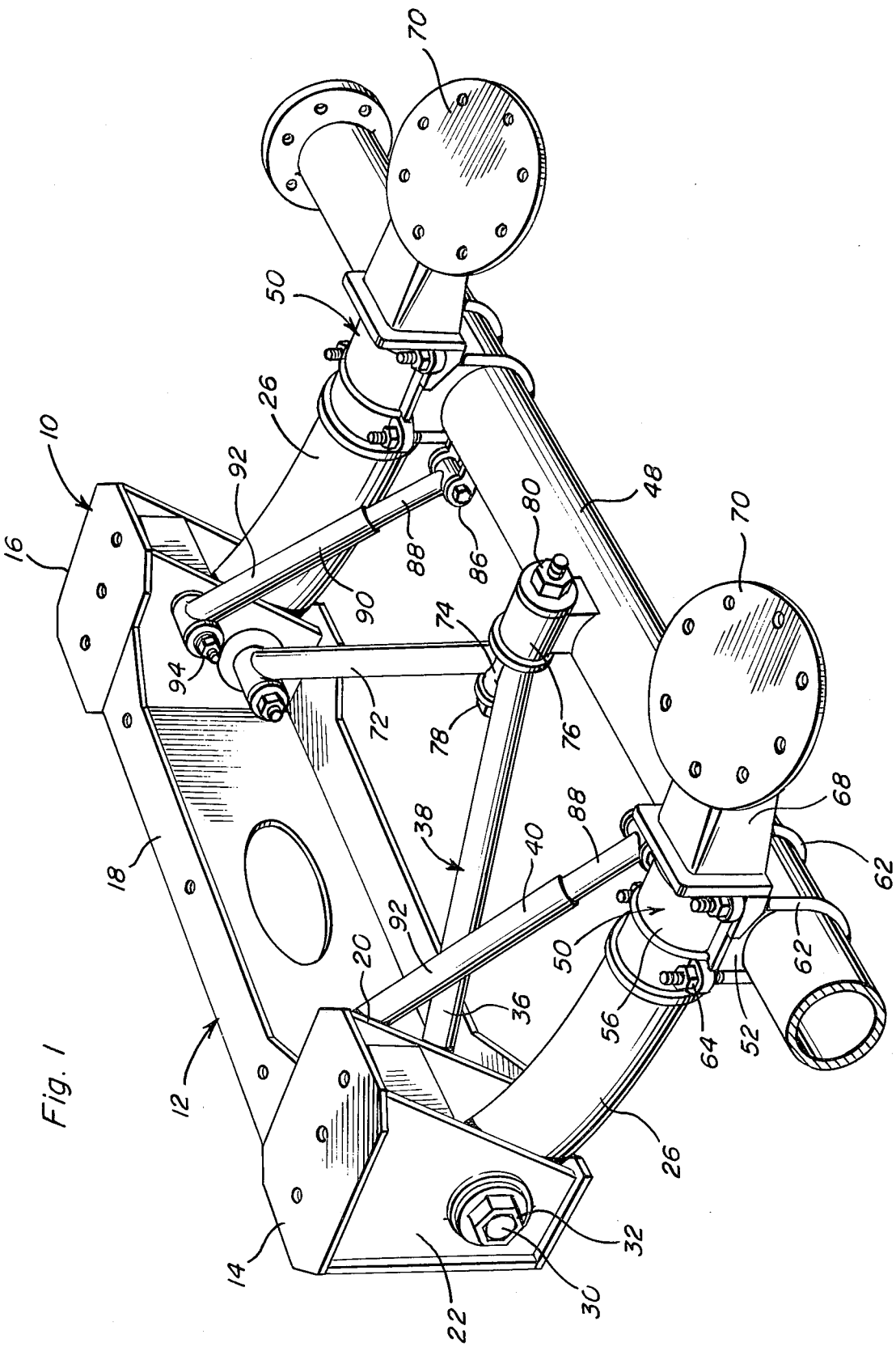
FIG. 1 is a perspective view of the trailing arm suspension of the instant invention.

Referring now more specifically to the drawings, the numeral 10 generally designates the trailing arm suspension system of the instant invention. The system 10 includes a forward transverse mounting frame referred to in general by the reference numeral 12. The frame 12 is elongated and includes opposite end portions 14 and 16 adapted to be bolted to opposite longitudinal frame members of the associated chassis. The longitudinal midportion 18 of the frame 12 which extends between the end portions 14 and 16 is adapted to be bolted beneath a transverse frame member of the chassis extending between the longitudinal frame beams thereof.

Figure 2:
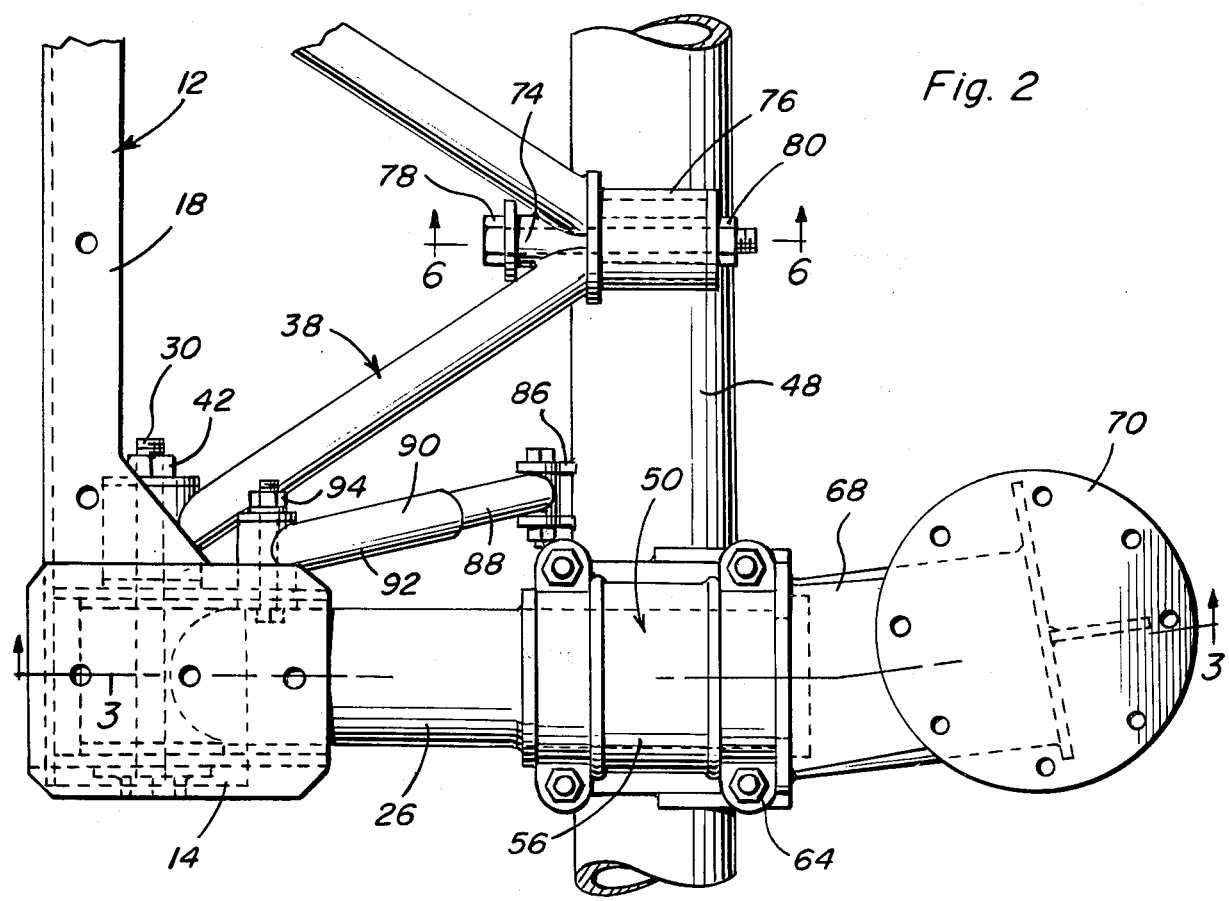
FIG. 2 is a fragmentary enlarged top plan view of the right hand portion of the trailing arm suspension.
Figure 6:
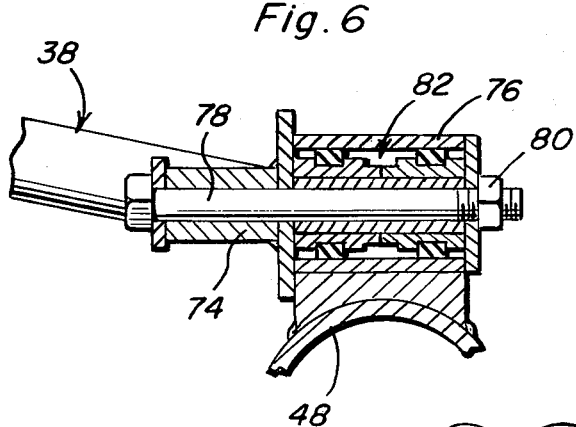
FIG. 6 is an enlarged fragmentary transverse vertical sectional view taken substantially upon the plane indicated by the section line 6—6 of FIG. 2.
Figure 7:
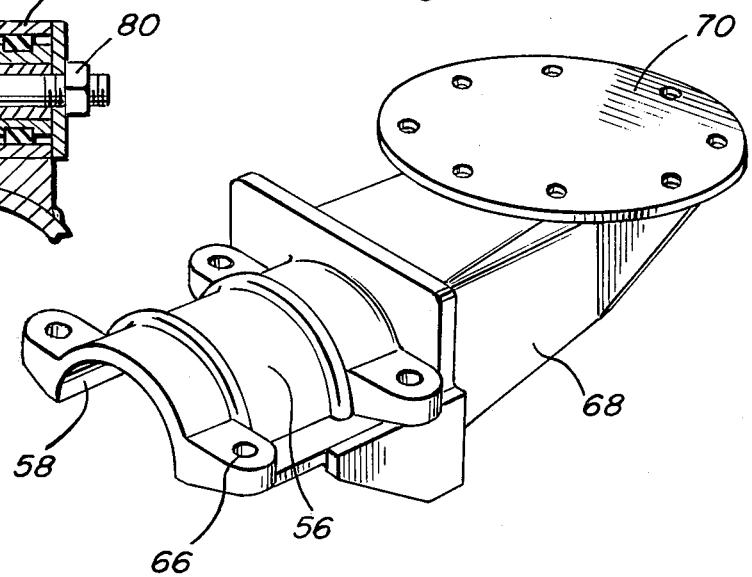
FIG. 7 is a perspective view of a portion of the clamp sleeve assembly for one of the trailing arms and illustrating the manner in which the associated lower air bag mount portion is formed integrally therewith.

The end portions 14 and 16 each include upstanding inner and outer plates 20 and 22 between which a forward transverse sleeve portion 24 of a tubular trailing arm 26 is pivotally mounted through the utilization of a resilient material equipped bushing assembly referred to in general by the reference numeral 27. Attaching bolts 28 are secured through the plates 20 and 22 and pass through the bushing assembly 27 contained within the sleeve portion 24, the heads 30 of the bolts 28 are stationarily anchored by bolt head cages 32 tack welded to the corresponding outer plates 22. The inner ends of the bolts 28 are also secured through a transverse sleeve 34 carried by one free arm end portion 36 of a Y-shaped stabilizer bar referred to in general by the reference numeral 38, the sleeve 34 also including a resilient material equipped bushing assembly referred to in general by the reference numeral 40. The end of the bolt 28 remote from the head 30 is secured through the sleeve 34 by a threaded nut 42. Of course, it may be seen from FIGS. 1, 2 and 4 of the drawings that the free arm end portion 36 is disposed inward of the end portion 14.

The rear end of the trailing arm 26 includes longitudinally spaced washers 44 and 46 telescoped thereover and secured in position thereon by welding.

The suspension assembly 10 further includes a transverse axle tube 48 and the end of the axle tube 48 registered with the end portion 14 includes a clamp-type mount referred to in general by the reference numeral 50 supported therefrom. The mount 50 comprises a sleeve mount and includes a lower saddle block 52 which downwardly embraces and is supported from the upper periphery of the axle tube 48. The saddle block 52 defines a partial sleeve bore 54 and the mount 50 further includes an upper component 56 defining a downwardly opening partial sleeve bore 58. A radially split resilient sleeve 60 is disposed about the rear end of the trailing arm 26 between the washers 44 and 46 and the lower peripheral portion of the resilient sleeve 60 is embraced by the partial sleeve bore 54 while the upper portion of the resilient sleeve 60 is downwardly embraced by the partial sleeve bore 58. A pair of U-bolts 62 are embraced about the underside of the axle tube 48 and have their threaded upper free ends secured, by threaded nuts 64, through vertical bores 66 formed in the upper component 56. In this manner, the clamp-type sleeve mount 50 is at least substantially rigidly supported from the axle tube 48 and clampingly engaged with the rear end of the trailing arm 26 in a manner enabling limited angular displacement of the trailing arm 26 about its longitudinal axis relative to the clamp-type sleeve mount 50. The forward end of the upper component 56 abuts the rear side of the washer 44 to prevent forward displacement of the clamp-type sleeve mount 50 on the arm 26 and a rear portion 66 of the upper component 56 is received forward of the washer 46 and thereby prevents rearward displacement of the mount 50 relative to the arm 26. The mount 50 includes a rearward extension 68 including a lower air bag mounting plate 70 supported therefrom.

It will be noted that the suspension assembly 10 includes a pair of trailing arms 26 which are operatively associated with opposite end portions of the axle 48 and it is to be understood that the attachment of the forward ends of both trailing arms 26 to the opposite end portions 14 and 16 of the mounting frame 12 is identical. In addition, the rear ends of the trailing arms 26 are identically mounted on the corresponding end portions of the axle tube 48.

The Y-shaped stabilizer bar 38 includes a second free arm end portion 72 which is pivotally anchored to the end portion 16 in the same manner in which the free arm end portion 36 is pivotally anchored to the end portion 14 and the stabilizer bar 38 additionally includes a base arm portion 74 which extends in a direction bisecting the angle between the free arm end portions 36 and 72 and which is secured through a front-to-rear extending sleeve 76 carried by the upper portion of the midportion of the axle tube 48. The base arm portion 74 includes an attaching bolt 78 which is secured through the sleeve portion 76 by a threaded nut 80 and it will be noted that the bolt 80 is bushed relative to the sleeve 76 through the utilization of a resilient material equipped bushing assembly referred to in general by the reference numeral 82.

Opposite end portions of the axle tube 48 also include forward mid-height shock absorber attaching mounts 86 to which the lower cylinder portions 88 of a pair of telescopic shock absorbers 90 are pivotally connected. The forward upper piston rod portions 92 of the shock absorbers 90 are pivotally anchored to the end portions 14 and 16 as at 94.

Of course, the suspension assembly 10 includes a pair of air bags (not shown) whose lower ends are supported from the plates 70 and whose upper ends are anchored relative to portions of the opposite side longitudinal frame members (not shown) of the associated chassis disposed rearward of the mount frame 12.

It will be noted that the suspension assembly 10 allows up and down movement of the axle tube 48 relative to the end portions 14 and 16 through oscillatory movement of the trailing arms 26 and that longitudinal displacement of the axle 48 relative to the mount frame 12 is prevented by the stabilizer bar 38. Further, one end of the axle 48 may be depressed and the other end of the axle 48 may be elevated due to the ability of the clamp-type sleeve mounts 50 to oscillate slightly relative to the rear ends of the trailing arms 26. However, the mounting plates 70 are substantially rigid with the axle tube 48 and, if desired, the saddle blocks 52 may be welded relative to the axle tube 48. Accordingly, with the mounting plates 70 substantially fixed relative to the axle tube 48, proper location of the lower air bag mounting plate 70 is assured.

The bushing assembly 27 includes a rigid inner sleeve 100 stationarily supported relative to said end portion 14, a rigid outer sleeve 102 stationarily supported from the forward end of the trailing arm 26 and rigid intermediate sleeve sections 104 rotatable on the inner sleeve section 100 and equipped with outer peripheral resilient rings 106 received in peripheral grooves 108 formed in the sleeves 104, the rings 106 being snugly received within the sleeve 102. In addition, the bushing assemblies 40 and 82 are similarly formed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a trailing arm suspension including a forward chassis mount portion, a front-to-rear extending trailing arm having its forward end pivotally suported from said mount portion for oscillation about a horizontal axis extending transversely of said arm, an elongated axle end disposed generally parallel to said axis, resilient material bushed sleeve means stationarily mounted on said axle in position generally normal thereto and mounted longitudinally on the rear end of said arm for limited angular displacement thereabout against longitudinal displacement relative to the arm, said sleeve means including an air bag lower mount portion stationarily mounted thereon, said resilient material bushed sleeve means including a lower upwardly opening generally semi-cylindrical sleeve section stationarily supported on said axle end, an upper downwardly opening generally semi-cylindrical sleeve section disposed over and opposing said lower sleeve section, resilient sleeve structure disposed about said rear end of said arm, and means operatively clampingly engaged with said sleeve sections with the latter clamped about said resilient sleeve structure and the rear end of said arm.

2. The combination of claim 1 wherein said air bag lower mount portion is disposed rearward of said axle end.

3. The combination of claim 1 wherein the forward end of said arm is pivotally supported from said mount portion through the utilization of resilient material bushed sleeve structure enabling slight angular displacement of said arm relative to said mount portion about an axis disposed normal to the axis of oscillation of said arm relative to said mount portion.

4. The combination of claim 3 wherein said mount portion includes inner sleeve structure stationary with said mount portion, outer sleeve structure stationary with said trailing arm, rigid intermediate sleeve structure rotatable on said inner sleeve structure and resilient outer periphery means carried by said intermediate sleeve structure snugly received in said outer sleeve structure.

5. The combination of claim 4 wherein said intermediate sleeve structure includes outer circumferential groove means formed therein and said resilient outer periphery means includes resilient ring means seated in said groove means.

6. A trailing arm axle suspension system including a forward chassis mount portion, a pair of trailing arms including forward ends pivotally mounted to said forward chassis mount portion for oscillation about substantially aligned axes extending transversely of said trailing arms and with said arms spaced laterally apart, an elongated axle assembly, means attaching the rear ends of said trailing arms to opposite end portions of said axle assembly, a Y-shaped stabilizer bar including free arm end portions pivotally anchored to said forward chassis mount portion adjacent and inward of the forward ends of said arms for oscillation about axes substantially coaxial with the aforementioned axes, said Y-shaped stabilizer bar including a base leg extending in a direction generally bisecting the angle formed between the free arm end portions of said Y-shaped stabilizer bar, said base leg portion being pivotally supported from said axle centrally intermediate the rear ends of said trailing arms for oscillation relative to said axle about an axis generally paralleling said trailing arms.

7. The combination of claim 6 including resilient material bushed clamp-type sleeve structure rigid with opposite end portions of said axle and clampingly engaged with the rear ends of said arms for limited oscillation relative thereto about the longitudinal axes of said arms and comprising the structure by which the rear ends of said arms are attached to corresponding end portions of said axle.

8. The combination of claim 7 wherein said clamp-type sleeve structures include air bag lower mounting plate portions stationarily supported therefrom.

9. The combination of claim 8 including forward resilient material bushed sleeve structure by which the forward ends of said arms are pivotally supported from said forward chassis mount portion, whereby the forward ends of said arms may be slightly angularly displaced relative to said forward mount portion about axes disposed generally normal to the axes of oscillation of said arms relative to said forward chassis mount portion.

10. In a trailing arm suspension including a forward chassis mount portion, a front-to-rear extending trailing arm having its forward end pivotally supported from said mount portion for oscillation about a horizontal axis extending transversely of said arm, an elongated axle end disposed generally parallel to said axis, resilient material bushed sleeve means stationarily mounted on said axle in position generally normal thereto and mounted longitudinally on the rear end of said arm for limited angular displacement thereabout and against longitudinal displacement relative to the arm, said resilient material bushed sleeve means including a lower upwardly opening generally semi-cylindrical sleeve section stationarily supported on said axle end, an upper downwardly opening generally semi-cylindrical sleeve section disposed over and opposing said lower sleeve section, resilient sleeve structure disposed about said rear end of said arm, and means operatively clampingly engaged with said sleeve sections with the latter clamped about said resilient sleeve structure and the rear end of said arm.

11. The combination of claim 10 wherein the forward end of said arm is pivotally supported from said mount portion through the utilization of resilient material bushed sleeve structure enabling slight angular displacement of said arm relative to said mount portion about an axle disposed normal to the axis of oscillation of said arm relative to said mount portion.

12. The combination of claim 11 wherein said mount portion includes inner sleeve structure stationary with said mount portion, outer sleeve structure stationary with said trailing arm, rigid intermediate sleeve structure rotatable on said inner sleeve structure and resilient outer periphery means carried by said intermediate sleeve structure snugly received in said outer sleeve structure.

13. The combination of claim 12 wherein said intermediate sleeve structure includes outer circumferential groove means formed therein and said resilient outer periphery means includes resilient ring means seated in said groove means.

* * * * *